United States Patent
Fiocchi (10) Patent No.: US 11,719,520 B2
(45) Date of Patent: Aug. 8, 2023

(54) WADDING SYSTEM

(71) Applicant: FIOCCHI MUNIZIONI S.p.A., Lecco (IT)

(72) Inventor: Costantino Fiocchi, Lecco (IT)

(73) Assignee: FIOCCHI MUNIZIONI S.p.A., Lecco (IT)

( * ) Notice: Subject to any disclaimer, the term of this patent is extended or adjusted under 35 U.S.C. 154(b) by 0 days.

(21) Appl. No.: 17/506,225

(22) Filed: Oct. 20, 2021

(65) Prior Publication Data

US 2022/0128339 A1 Apr. 28, 2022

(30) Foreign Application Priority Data

Oct. 27, 2020 (IT) .......................... 102020000025438

(51) Int. Cl.
*F42B 7/08* (2006.01)

(52) U.S. Cl.
CPC ..................................... *F42B 7/08* (2013.01)

(58) Field of Classification Search
CPC .... F42B 7/08; F42B 7/04; F42B 7/043; F42B 7/06
USPC ....... 102/451, 449, 450, 452, 453, 454, 455, 102/456, 457, 461
See application file for complete search history.

(56) References Cited

U.S. PATENT DOCUMENTS

| | | | |
|---|---|---|---|
| 3,266,421 A | 8/1966 | Comerford | |
| 3,270,669 A * | 9/1966 | Atkins | F42B 7/08 102/451 |
| 3,788,224 A * | 1/1974 | Merritt | F42B 7/08 102/450 |
| 5,859,090 A * | 1/1999 | Shahid | F42B 7/06 523/124 |
| 7,610,857 B1 * | 11/2009 | Dunnam | F42B 12/382 102/458 |
| 8,800,449 B2 * | 8/2014 | Schluckebier | F42C 19/02 102/451 |
| 11,333,471 B2 * | 5/2022 | Maricaille | F42B 7/08 |
| 2001/0042486 A1 * | 11/2001 | Dales | F42B 7/046 102/449 |
| 2018/0274890 A1 * | 9/2018 | Havens | C08L 67/04 |
| 2021/0270586 A1 * | 9/2021 | Maricaille | F42B 7/08 |

FOREIGN PATENT DOCUMENTS

| | | | | |
|---|---|---|---|---|
| DE | 4016826 A | * | 11/1991 | .............. F42B 7/08 |
| GB | 2172967 A | * | 10/1986 | .............. F42B 7/08 |
| GB | 2367606 A | | 4/2002 | |
| WO | 199105982 A1 | | 5/1991 | |
| WO | 2020008390 A1 | | 1/2020 | |

OTHER PUBLICATIONS

Vermander, Wim "Italian Search Report and Written Opinion of Italian Application No. IT 102020000025438," The Hague, Italian Patent and Trademarks Office, dated Jul. 19, 2021.

* cited by examiner

*Primary Examiner* — John Cooper (74) *Attorney, Agent, or Firm* — Florek & Endres PLLC (57) ABSTRACT

The present invention concerns a wadding system, in particular a specific wadding system dedicated to shot cartridges made of materials other than lead.

15 Claims, 7 Drawing Sheets

WADDING SYSTEM

The present invention concerns a wadding system, in particular a specific wadding system dedicated to shot cartridges made of materials other than lead.

Figure 1:
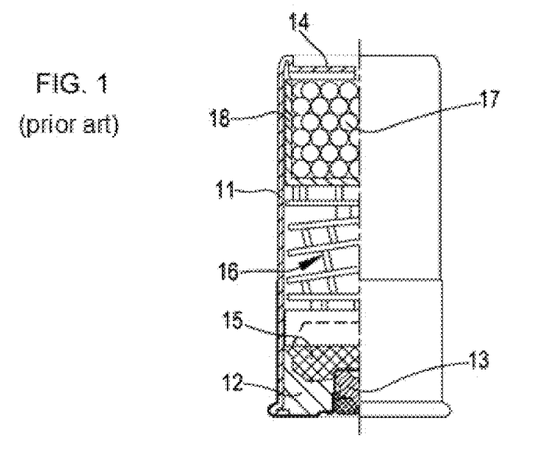
FIG. 1 is a sectional view of half of a generic shot cartridge according to the current state of the art.

As is well known and as shown in FIG. 1, a generic shot cartridge consists of a case 11, which is closed inferiorly by a bottom 12, carrying a primer 13, and capped superiorly by a pad or star-shaped closure 14 obtained by folding the tube of the case 11.

Inside the case 11 and in contact with the primer 13 there is housed a charge of gunpowder 15 above which a wad or a system of wads 16 is placed and in succession the cartridge shots 17.

In the case of cartridges with lead shots or other metallic materials of similar hardness (less than 40 HV1), the function of the wad 16 is essentially to transmit to the shots itself 17 the thrust generated by the pressure developed by the combustion of the gunpowder 15 during firing.

The hardness is calculated and defined according to the international and European standards "EN ISO 6507-1: Metallic Materials—Vickers Hardness Test—Part 1: test method". In fact, the HV1 hardness is generally measured with a load of 1 Kgf (9.8N) applied to the indenter as the suggested test method.

As is well known, however, for cartridges with metallic shots having a hardness greater than 40 HV1 (e.g. shots made of materials with a high hardness such as steel, tungsten and relative alloys), in addition to the normal function of pushing the shots 17, the wad 16 must also prevent contact between the same shots 17 and the barrel of the firearm during firing in order to prevent damage to the barrel. For this reason, the wad 16 must contain entirely the mass of shots 17 and resist firing without breaking. The wad must also be able to withstand different temperatures (standards set a temperature range of −20° C. to +50° C.).

The material used for wads is normally low-density polyethylene (PELD or LDPE), which effectively allows achieving these objectives and performs all these tasks well. Alternatively, the use of biodegradable/compostable materials with which PELD has been attempted to be replaced is known. However, these materials are unable to withstand the pressure generated when it is fired, especially at low temperatures, and thus cannot prevent contact between the shots and the barrel of the firearm with consequent damage to the latter.

WO 2020/008390 A1 concerns a cup-shaped wad for cartridges comprising a cylindrical casing with an inner reinforcing element with a bottom cap glued together with assembly problems and assembly costs.

WO 91/05982 refers to a wad in general made of biodegradable plastic material with intermediate cushioning 7 made in one piece usually referred to one component per cartridge.

GB 2367606 relates to a wad made of biodegradable plastic material with reference to its generic construction and its material.

U.S. Pat. No. 3,266,421 relates to a cartridge with a one-piece polyethylene wad where the cup-shaped portion that receives the shots has a paper bottom.

The underlying problem of the present invention is therefore that of making a safety wadding system that is able to overcome the limits of the prior art in a simple, reliable and cheap manner.

In the context of this problem, an object of the present invention is to identify a wadding system for cartridges with shots made of a material other than lead, in particular with shots made of a material having a hardness greater than 40 HV1.

A further object of the present invention is to realise a wadding system for cartridges with shots made of a material other than lead, in particular with shots made of a material having a hardness greater than 40 HV1, which is at the same time eco-friendly and thus does not envisage using non-biodegradable/compostable materials.

In accordance with a first aspect thereof, the invention thus concerns a wadding system comprising a combination of an over-powder pad made of pressed cardboard, natural felt or other biodegradable-compostable material, with a separate container made of biodegradable material enclosing shots made of a material having a hardness greater than 40 HV1.

Advantageously, this results in a wadding system which, once inserted into a cartridge with shots made of a material with high hardness, allows not damage the barrel of the firearm, while at the same time being completely biodegradable.

The present invention may have at least one of the following preferred features; the latter may in particular be combined with one another as desired in order to meet specific application needs.

Preferably, the over-powder pad has a thickness ranging from 1 to 10 mm.

Advantageously, it is thus possible to obtain a wadding system which does not break when fired even at low temperatures.

More preferably, the lower part of the container can be defined by a plane surface which promotes placing the over-powder pad in abutment, cooperating therewith.

More preferably, the over-powder pad has a cylinder-shape with a minimum height and the container is a hollow cylinder with a base having a thickness greater than the thickness of the container wall.

Even more preferably, the wadding system according to the present invention also comprises a felt wad interposed between the over-powder pad and the container, preferably a cylinder-shaped felt wad with a thickness that is greater than the over-powder pad thickness.

Advantageously, the biodegradable-compostable felt wad also promotes greater pressure tightness and a certain non-interference with the inner wall of the firearm barrel.

Preferably, the container can be shaped and has at the bottom thereof an edge that extends downward forming a recess.

This feature, advantageously, also acts as a gasket and ensures a better tightness of the gases themselves.

More preferably, the container can be pre-notched, thus facilitating opening the wad at the exit of the shotgun barrel and to avoid shots from remaining trapped inside the wad itself without forming the proper group.

By way of a non-exhaustive example, the container made of biodegradable material can consist of a plastic material obtained from corn or potatoes starch, or polylactic acid (PLA).

A further an object of the present invention is a cartridge comprising the aforesaid wadding system.

Further features and advantages of the present invention will be more evident from the following detailed description of certain preferred embodiments thereof made with reference to the appended drawings.

The different features in the individual configurations may be combined with one another as desired according to the preceding description, should there be advantages specifically resulting from a specific combination.

In such drawings.

For the illustration of the drawings, use is made in the following description of identical numerals to indicate construction elements with the same function. Further, for illustration clarity, some numerical references may not be repeated in all the figures. Indications such as "vertical" and "horizontal", "upper" and "lower" (in the absence of other indications) are to be read with reference to the assembly (or operating) conditions and with reference to the normal terminology used in current language, where "vertical" indicates a substantially parallel direction to that of the gravitational force vector "g" and horizontal to a direction perpendicular thereto.

As previously reported, with respect to FIG. 1, a generic shot cartridge has been described, which provides for a known wad or system of wads 16 within the case 11 and in contact with the gunpowder charge 15. In FIG. 1, for example, a wad made of plastic material can be distinguished which comprises a series of shelf-like portions variously interconnected and arranged between the gunpowder charge 15 and a container terminal portion 18 in which the shots are arranged 17.

Figure 6:
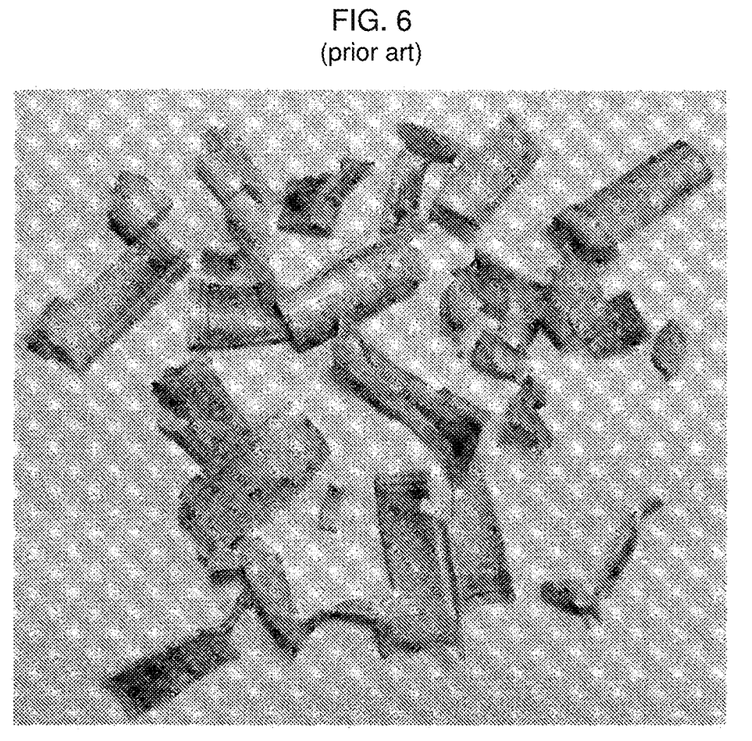
FIG. 6 shows in a perspective view a wad-container system of known type broken into a plurality of parts after firing.

Such an arrangement, after firing, leads to the breakage of the wad assembly into a plurality of parts as shown in FIG. 6. The plastic parts are thus split, which then fall on the ground and which are difficult to naturally dispose of, causing soil pollution and being particularly harmful even for animals that can inadvertently feed on them.

In fact, for every cartridge that is fired, the firearm produces a discharge of the wad used, which, broken into numerous small parts, spreads even at a considerable distance from the position where it was fired.

Distance and carelessness on the part of the user, as well as objective difficulties in recovering all the small parts of ejected wad, thus give rise to a kind of environmental pollution. The plastic components that do not biodegrade, in fact, cause long-lasting pollution.

It should also be reminded that known wads or wadding assemblies or systems, in addition to separating the powder from the shots, expand to form a sealing against the thrust gases of the shot as they travel along the barrel of the firearm. This allows on the one hand to guarantee speed efficiently and on the other to provide adequate protection to the barrel, which aspect is particularly important when using metallic shots made of a material other than lead having a hardness greater than 40 HV1.

All these residues or debris of non-biodegradable plastic thus abandoned pollute land and water near the places where they are used. So far, there is no known practical and inexpensive way of recovering these residues in order to prevent such pollution.

According to the present invention, a wad or wad assembly has been developed which allows to eliminate these problems.

Figure 2A:
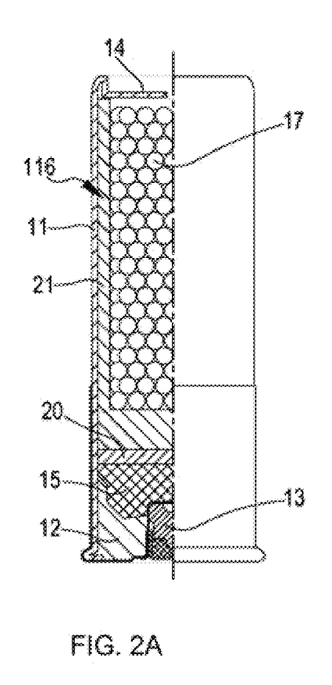
FIGS. 2A to 2D are sectional views of shot cartridge halves using embodiments of the wadding system according to the present invention.

FIG. 2A shows what the positioning of the wadding system of the invention is within a generic shot cartridge SP within the case 11 and in contact with a relative gunpowder charge 15. The shot cartridge SP, comprising the wadding system according to a first embodiment of the present invention, is in fact composed of a case 11, which is closed inferiorly by a bottom 12, carrying a primer 13, and is capped superiorly by a pad or a star-shaped closure 14 obtained by folding the tube of the case 11. Inside the case 11 and in contact with the primer 13 there is housed a gunpowder charge 15 above which the wadding system of the invention is placed, comprising a combination of an over-powder pad 20 with a container 21 containing shots 17, wherein the over-powder pad 20 and the container 21 are separate and independent of each other.

Figure 3A:
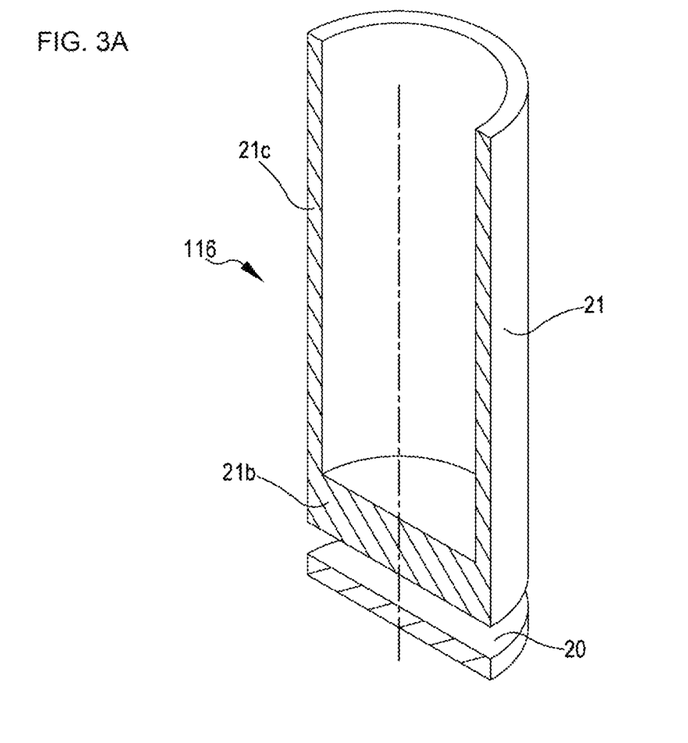
FIG. 3A is a sectional view of one half of a first embodiment of a wadding system according to the present invention with exploded view of a cardboard over-powder pad below it.
Figure 3B:
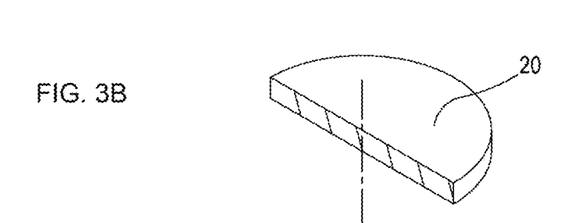
FIG. 3B shows only the cardboard over-powder pad of FIG. 3A.

More specifically, in such a first embodiment shown in FIGS. 3A and 3B, such a wadding system or wad assembly 116 according to the present invention provides for arranging in combination an over-powder pad 20 made of pressed cardboard, natural felt or other biodegradable-compostable material, with a separate container 21 made of biodegradable material enclosing all the shots.

On the one hand, the over-powder pad 20 withstands, even at low temperatures, the gas pressures generated by firing and already forms a good sealing against the thrust gas of the shot. The thickness of the pad ranges from 1 to 10 mm. On the other hand, the presence of a separate container 21 made of biodegradable material enclosing all the shots prevents the shots from coming into contact with the barrel during the ejection path in the shotgun barrel, thus scoring it and damaging it in some way.

It is therefore only thanks to the presence in combination of both elements of the wadding system interacting synergistically that the technical problem of finding an efficient and biodegradable wadding system for the use of shots made of a material other than lead can be solved.

In addition, the lower part of the container 21 can be defined by a plane surface 23 which promotes placing the over-powder pad 20 in abutment, cooperating therewith. In the example, the over-powder pad 20 has a cylinder-shape with a minimum height, while the container 21 is a hollow cylinder with a base 21b having a thickness greater than the thickness of the container wall 21c.

And such an arrangement works very well even in the presence of cartridges with shots made of a materials with high hardness (steel, tungsten and relative alloys).

And above all, both the over-powder pad 20 and the container 21 are, as we have seen, made of biodegradable-compostable material, free of any negative impact and pollution on the environment.

Figure 4A:
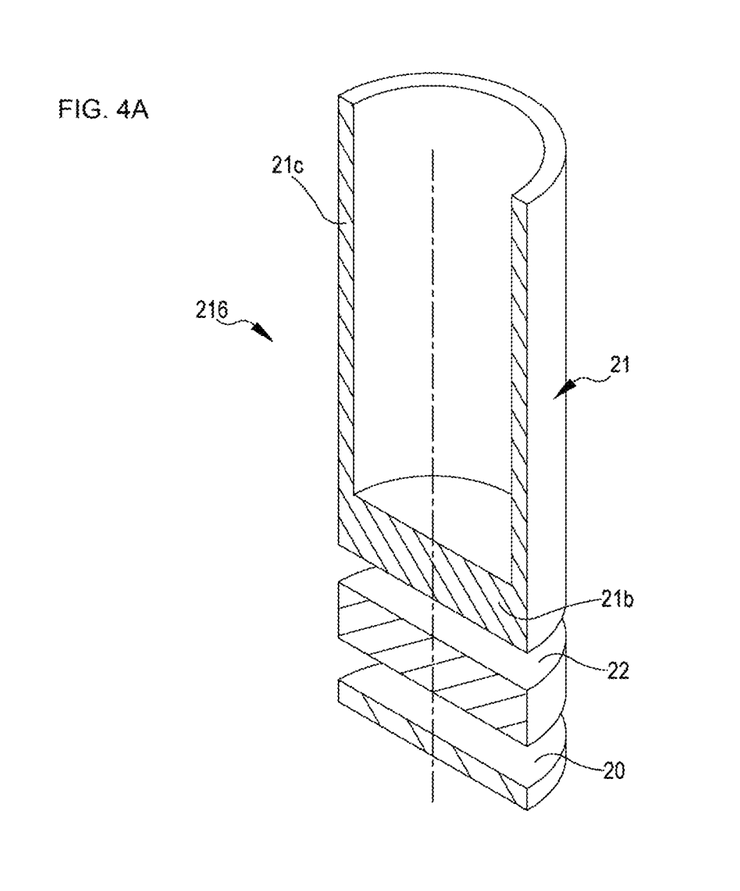
FIG. 4A is a sectional view of one half of a second embodiment of a wadding system according to the present invention comprising a felt wad with exploded view of a cardboard over-powder pad below it.
Figure 4B:
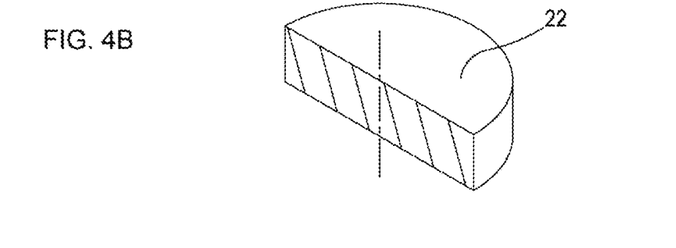
FIG. 4B shows the felt wad of FIG. 4A alone.

FIGS. 4A and 4B show a second embodiment of a wad assembly or wadding system according to the present invention denoted overall by 216, wherein elements identical to the preceding ones are denoted by the same reference numbers. Such a wadding system 216 comprises, in addition to an over-powder pad 20 and a shot container 21, also an interposed felt wad 22, for example also cylinder-shaped with a thickness greater than that of the over-powder pad 20.

Preferably said wad made of felt can have a thickness ranging from 10 to 21 mm.

This wad made of felt or other biodegradable-compostable material 22, when present, has the sole function of a filler and of element that promotes a greater pressure tightness and a certain non-interference with the inner wall of the firearm barrel.

Figure 2B:
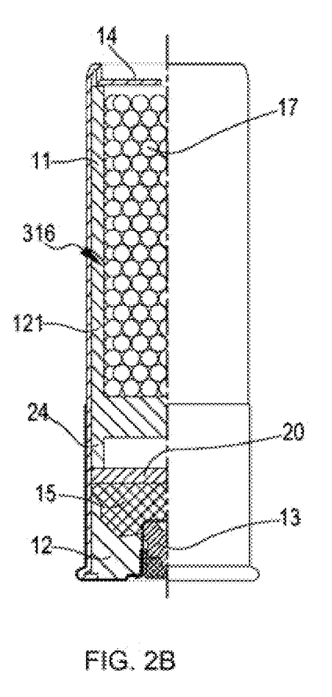
Figure 2C:
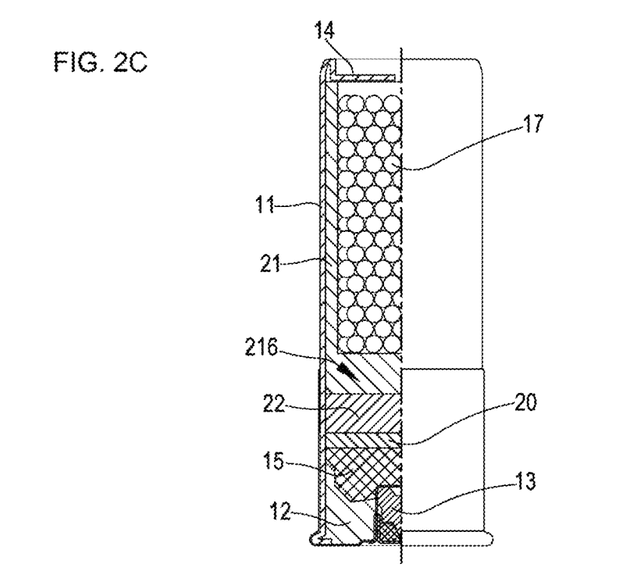

FIG. 2C shows how such an embodiment of a wad assembly or wadding system is arranged in the shot cartridge SP. The case 11 is also provided, closed inferiorly by the bottom 12, carrying the primer 13 and capped superiorly by the star-shaped closure 14. Inside the cartridge case 11 and in contact with the primer 13 there is housed a powder charge 15 above which the wadding system of the invention is placed, comprising the combination of an over-powder pad 20 with a container 21 containing shots 17. The wad made of felt or other biodegradable-compostable material 22 is arranged on top of the pad 20 as mentioned above.

Preferably, the wadding system also comprises a wad made of felt when shots made of high-density material (e.g. tungsten alloys) are used.

In addition, the wadding system according to the present invention ensures that the shot container 21 does not split during the strains due to firing. On the contrary, what generally happens with known wads is shown in FIG. 6, where the container wad breaks and splits into a plurality of parts when fired. This results in the shots coming into contact with the inner parts of the firearm barrel, scoring it and damaging it considerably.

Instead, according to the present invention, the presence of the combination over-powder pad 20 and separate container 21 allows the latter to maintain its integrity during the travel in the barrel after firing by preventing abrasive actions of the shots on the firearm barrel, the container 21 for the shots not to split during the strains due to firing and thus being eliminated in one piece.

Figure 5:
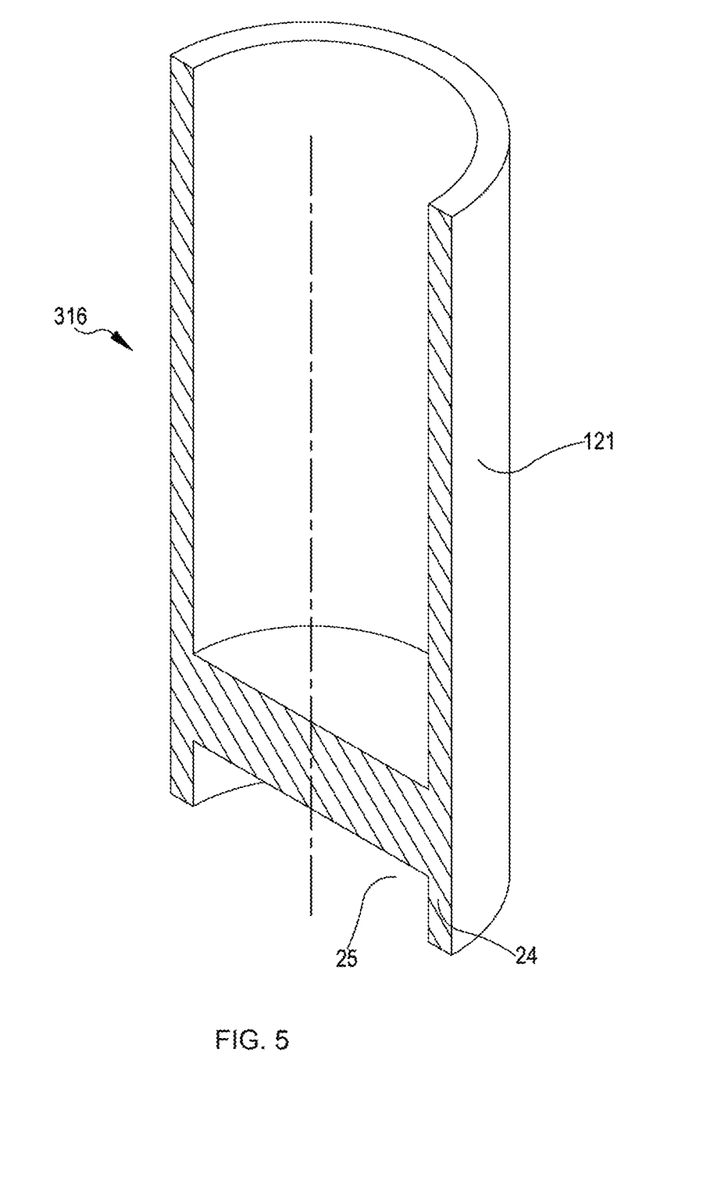
FIG. 5 is a sectional view of one half of a third embodiment of a wadding system according to the present invention comprising a shaped container.

Such an action is better and further ensured if the embodiment of FIG. 5 is used, in which the wad assembly 316 according to the present invention consists of a shaped container 121 which at the bottom thereof envisages having an edge 24 that extends downwards forming a recess 25. With such a shaping, the edge 24 also acts as a gasket. Moreover, in such a case, when fired, the over-powder pad 20 is forced by the gases into the recess or niche 25 of the lower part of the wad. In this way, the over-powder pad 20, by pressing on the edge or lower lip 24, contributes to the tightness of the gases themselves.

FIG. 2B shows the case 11, where equal reference numbers are used for equal elements, comprising the combination of an over-powder pad 20 with a container 121 containing the shots 17 according to this embodiment.

Figure 2D:
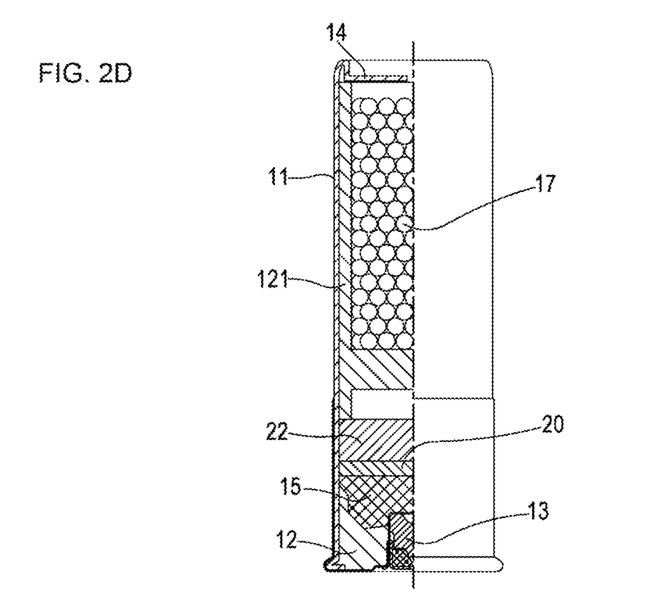

FIG. 2D shows yet another embodiment in which the wadding system comprises in combination a container 121, the wad 22 made of felt or other biodegradable-compostable material and the pad 20.

Figure 8:
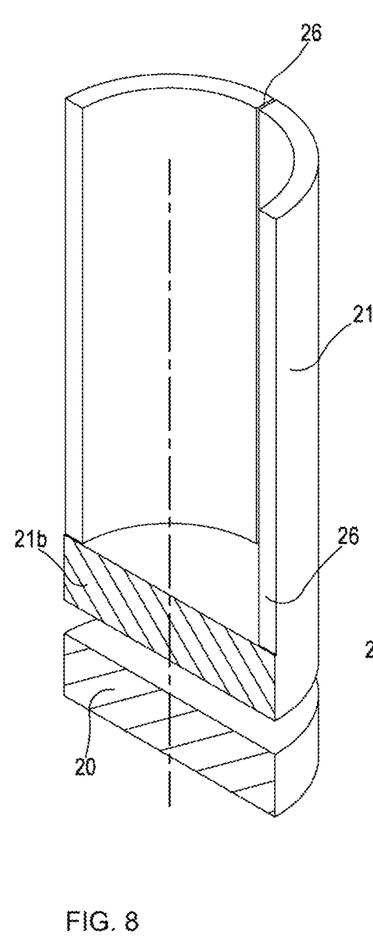
FIG. 8 is a sectional view of one half of an embodiment, analogous to the embodiment of FIG. 3A, provided with cross-shaped notches according to the present invention with exploded view of an over-powder pad below it.
Figure 9:
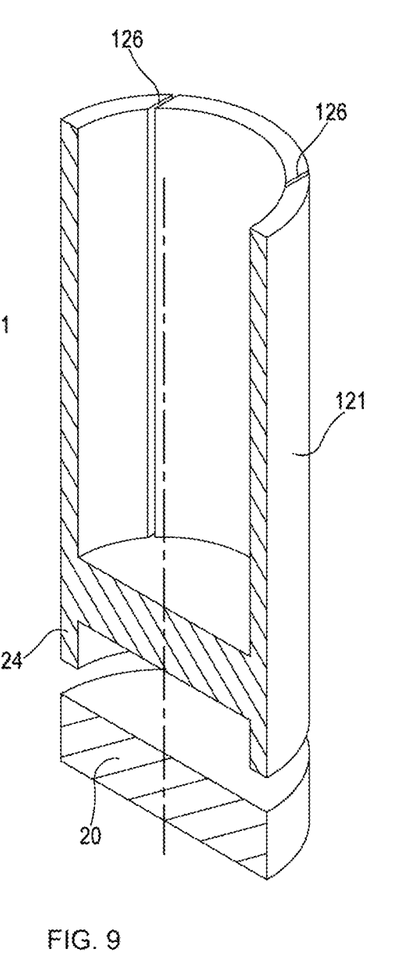
FIG. 9 is a sectional view of one half of an embodiment of a wadding system according to the present invention, analogous to the embodiment of FIG. 5, with a shaped container provided with crosswise notches.

In yet other alternative embodiments, shown in FIGS. 8 and 9, the container 21, 121 may already be pre-notched with notches 26, 126 to allow opening the wad at the exit of the shotgun barrel and to avoid shots from remaining trapped inside the wad itself without forming the correct group.

Figure 7:
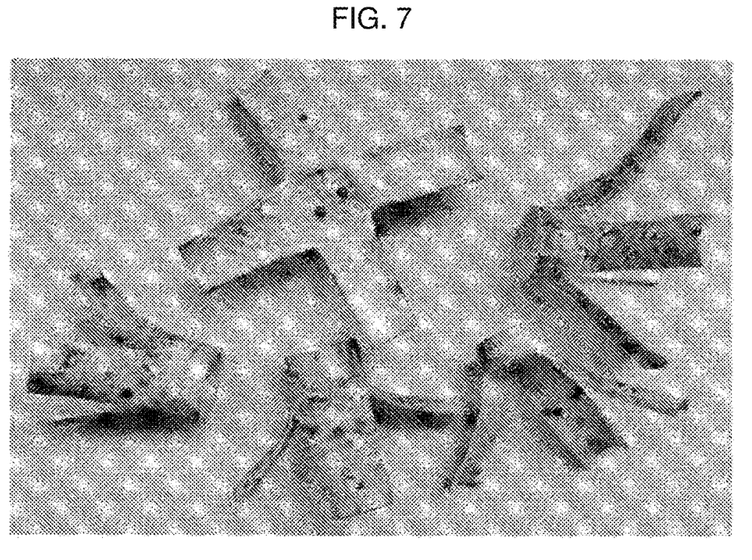
FIG. 7 shows in a perspective view a wad-container system according to the present invention which maintains its integrity even after firing.

When fired, the container 21, 121 appears as a single body, open in wedges like a banana peel, and does not disperse into the environment in the form of numerous small plastic parts: it is therefore much easier for the user to recover it for immediate disposal thereof, for example in the case of sporting events. This behaviour is evident from FIG. 7 which shows in a perspective view a container wad according to the present invention which maintains its integrity even after firing.

The solution thus described allows:
to have a wadding system adapted to make cartridges with high hardness shot that respect the standards;
to be completely biodegradable-compostable;
to reduce the thicknesses of the biodegradable plastic component by accelerating the biodegradation process, thanks to the presence of the over-powder pad;
the wad can be processed without problems by modern loading machines.

From the description made, the characteristics of the wadding system like the one subject-matter of the present invention are clear, as are the relative advantages.

From the embodiments described above, additional variants are possible, without departing from the teaching of the invention.

Finally, it is clear that the wadding system thus conceived is susceptible of numerous modifications and variations, all of which are within the scope of the invention; moreover, all the details can be replaced by technically equivalent elements. In practice, the materials used, as well as their dimensions, can be of any type according to the technical requirements.

The invention claimed is:

1. A wadding system comprising a container made of biodegradable material configured for containing and enclosing shot made of a material having a hardness greater than 40 HV1 and a separate and independent over-powder pad made of pressed cardboard and a biodegradable-compostable material, not attached to the container, where the over-powder pad has a thickness of from 1 to 10 mm.

2. The system according to claim 1, where a lower part of the container comprises a plane surface.

3. The wadding system according claim 2, where the separate over-powder pad abuts the plane surface.

4. The wadding system according to claim 1, where the over-powder pad has a cylinder-shape with a minimum height and the container comprises a hollow cylinder with a base having a thickness greater than a thickness of the container wall.

5. The wadding system according to claim 1, where said wadding system comprises a wad felt interposed between the over-powder pad and the container.

6. The wadding system according to claim 5, where said wad felt is cylinder-shaped with a thickness that is greater than a thickness of the over-powder pad.

7. The wadding system according to claim 6, where the thickness of the wad felt ranges from 10 to 21 mm.

8. The wadding system according to claim 1, where the container comprises a bottom having an edge that extends downward to form a recess.

9. The wadding system according to claim 1, where the container comprises notches to facilitate opening a wad at an exit of a shotgun barrel and to avoid shot from remaining trapped inside the wad.

10. The wadding system according to claim 9, where the notches are cross-shaped notches or crosswise notches.

11. The wadding system according to claim 1, where the shot having a hardness greater than 40 HV1 comprise steel, tungsten, one or more corresponding alloys and combinations thereof.

12. The wadding system according to claim 1, where the container made of biodegradable material comprises a plastic material obtained from corn, potato starch, polylactic acid (PLA) or combinations thereof.

13. The wadding system according to claim 1, wherein the biodegradable-compostable material comprises felt.

14. The wadding system according to claim 13, wherein the felt comprises a natural felt.

15. A cartridge comprising the wadding system according to claim 1.

\* \* \* \* \*